United States Patent
Zhou et al.

(10) Patent No.: US 12,252,560 B2
(45) Date of Patent: Mar. 18, 2025

(54) PROCESS FOR THE PREPARATION OF HIGH-SOLIDS, LOW-VISCOSITY LATEX USING SELECTIVE HYDROPHILIC MACRO-RAFT AGENTS

(71) Applicant: SPECIALTY OPERATIONS FRANCE, Lyons (FR)

(72) Inventors: Lichang Zhou, Lawrenceville, NJ (US); DongCheel Lee, Bucheon-Si (KR); Tiffany Chen, Philadelphia, PA (US); Fabio Trezzi, Puteaux (FR); Shailesh Majmudar, Stamford, CT (US); Homayoun Jamasbi, Lansdale, PA (US); An Tran, Newtown, PA (US); Pierre-Emmanuel Dufils, Paris (FR); Laurianne Timbart, Bensalem, PA (US); David James Wilson, Coye la Foret (FR); Changheon Kang, Siheung (KR)

(73) Assignee: SPECIALTY OPERATIONS FRANCE, Lyons (FR)

(*) Notice: Subject to any disclaimer, the term of this patent is extended or adjusted under 35 U.S.C. 154(b) by 692 days.

(21) Appl. No.: 17/603,211

(22) PCT Filed: Apr. 14, 2020

(86) PCT No.: PCT/US2020/028053
§ 371 (c)(1),
(2) Date: Oct. 12, 2021

(87) PCT Pub. No.: WO2020/214553
PCT Pub. Date: Oct. 22, 2020

(65) Prior Publication Data
US 2022/0195077 A1 Jun. 23, 2022

Related U.S. Application Data

(60) Provisional application No. 62/834,606, filed on Apr. 16, 2019.

(51) Int. Cl.
| | |
|---|---|
| C08F 218/08 | (2006.01) |
| C08F 2/22 | (2006.01) |
| C08F 2/38 | (2006.01) |
| C08F 212/08 | (2006.01) |
| C08F 220/14 | (2006.01) |
| C08F 220/18 | (2006.01) |
| C09D 5/02 | (2006.01) |
| C09D 133/12 | (2006.01) |

(52) U.S. Cl.
CPC .............. *C08F 2/38* (2013.01); *C08F 2/22* (2013.01); *C08F 212/08* (2013.01); *C08F 218/08* (2013.01); *C08F 220/14* (2013.01); *C08F 220/1804* (2020.02); *C09D 5/02* (2013.01); *C09D 133/12* (2013.01); *C08F 2438/03* (2013.01)

(58) Field of Classification Search
CPC ................ C08F 218/08; C08F 220/14; C08F 220/1804; C08F 212/08; C08F 2/22; C08F 2/38
See application file for complete search history.

(56) References Cited

U.S. PATENT DOCUMENTS

| | | | | |
|---|---|---|---|---|
| 6,153,705 A | * | 11/2000 | Corpart | C08F 293/005 |
| | | | | 525/308 |
| 10,774,258 B2 | * | 9/2020 | Cadix | C08F 261/04 |
| 2006/0039939 A1 | | 2/2006 | Lai et al. | |
| 2010/0255329 A1 | | 10/2010 | Couvreur | |
| 2017/0362425 A1 | * | 12/2017 | Siddiqui | C09D 133/04 |
| 2018/0072909 A1 | * | 3/2018 | Zhou | C09D 113/02 |

FOREIGN PATENT DOCUMENTS

| | | | | |
|---|---|---|---|---|
| EP | 2172491 A1 | 4/2010 | | |
| WO | 9630421 A1 | 10/1996 | | |
| WO | 9858974 A1 | 12/1998 | | |
| WO | 9903894 A1 | 1/1999 | | |
| WO | 9931144 A1 | 6/1999 | | |
| WO | 2009090253 A1 | 7/2009 | | |
| WO | 2019063445 A1 | 7/2009 | | |
| WO | WO-2017218735 A1 | * | 12/2017 | ............ C08F 218/08 |
| WO | WO-2018049135 A1 | * | 3/2018 | .......... C08F 293/005 |

OTHER PUBLICATIONS

Jenkins, et al., Glossary of basic terms in polymer science (IUPAC Recommendations 1996), 1996, Pure & Appl. Chem., vol. 68, No. 12, pp. 2287-2311 https://doi.org/10.1351/pac199668122287.
Standard Test Methods for Scrub Resistance of Wall Paints—ASTM international test method: (Designation: D 2486-06), 2006.
Yaqing Qu et al: "In situ synthesis of thermo-responsive ABC triblock terpolymer nano-objects by seeded RAFT polymerization"., Polymer Chemistry, vol. 5 No. 19, Jan. 1, 2014 (Jan. 1, 2014), pp. 5569-5577, KP055460593, Cambridge.
Marion Chenal et al : "Ab initio RAFT emulsion polymerization of butyl acrylate mediated by poly(acrylic acid) trithiocarbonate", Polymer Chemistry, vol. 4, No. 3, Jan. 1, 2013 (Jan. 1, 2013), pp. 752-762 XP055414566.

* cited by examiner

*Primary Examiner* — Rip A Lee
(74) *Attorney, Agent, or Firm* — Osha Bergman Watanabe & Burton LLP

(57) ABSTRACT

Processes to prepare aqueous polymer dispersions are provided, as well as compositions thereof, which have high solids content (e.g., 50%) with low viscosity. The process uses a selective hydrophilic macro-RAFT agent of formula (I), and is substantially free of surfactants. This process can be used to make latex polymers with good stability, which can be used widely in coatings (e.g., architectural paints, stone paints, industrial coatings, wood coatings, etc.), adhesives, sealants and mastic compositions.

20 Claims, No Drawings

PROCESS FOR THE PREPARATION OF HIGH-SOLIDS, LOW-VISCOSITY LATEX USING SELECTIVE HYDROPHILIC MACRO-RAFT AGENTS

FIELD OF THE INVENTION

This application relates to processes to prepare aqueous polymer dispersions, as well as compositions thereof. The process uses hydrophilic precursors with an xanthate moiety (or other chain-transfer agent or "CTA"), specifically a selective hydrophilic macro-RAFT agent of formula (I), in a two-stage emulsion polymerization, without the need for emulsifying surfactants. This process can be used to make improved latex polymers with good stability, which can be used widely in coatings (e.g., architectural paints, stone paints, industrial coatings, wood coatings, etc.), adhesives, sealants and mastic compositions. In preferred embodiments, high solids latex compositions are provided, which have low viscosity, e.g., for paint or coating compositions.

BACKGROUND OF THE INVENTION

Latexes are colloidal dispersions of polymer particles in water, produced by emulsion polymerization. Latexes are used in a broad range of applications, and offer considerable advantages for industrial synthesis. They represent an attractive alternative to solvent-based formulations.

Typically, surfactants are used to prepare the seed for emulsion polymer latexes and, as such, surfactants play a crucial role in the formation of emulsion polymer latexes. Once the latex has been formed, however, surfactants remaining in the formulation can be detrimental in the final application or coating. Surfactants can have negative effects on the latex compositions, including with regard to water sensitivity, adhesion, impact on paint films (leaching, efflorescence, surface tension defects, etc.) and low to zero foam. For example, one drawback in having surfactant remaining in the formulation is surfactant blooming or surfactant blushing. Surfactant blooming, or blushing, occurs when a film is contacted with water and the surfactant migrates. This can result in the film becoming hazy, an undesirable property.

It is also believed that excess surfactant results in low water resistivity to the final coating application. Post-polymerization mobility of the surfactants is yet another problem associated with the use of surfactant during emulsion polymerization of the latex. For example, surfactants can migrate from the surface of latex particles to the liquid-air interface or from the surface of a formed latex film. It is desirable to minimize the adverse effects of surfactants in water borne emulsion polymer latex applications.

SUMMARY OF INVENTION

The application describes a process to prepare an aqueous polymer dispersion, which has high solid content (e.g., 50%) with a low viscosity, through a two-stage process that uses a selective hydrophilic macro-RAFT agent of formula (I). This process can be used to make latex polymers with good stability, which can be used widely as coatings (e.g., architectural paints, stone paints, industrial coatings, wood coatings, etc.), adhesives, sealants and mastic compositions.

Latexes, as described herein, are made without the use of a surfactant, but by inducing molecular self-assembly of polymeric emulsifier particles prepared by RAFT.

It has been surprisingly discovered that emulsion polymerization of hydrophobic monomers can be performed directly in batch ab initio conditions using water-soluble macro-RAFT/MADIX agents. In such conditions, amphiphilic block copolymers form and self-assemble into self-stabilized particles within the course of the polymerization by polymerization-induced self-assembly (PISA). This process solves the problems met during the attempts to implement RAFT/MADIX in ab initio emulsion such as loss of molecular weight control, loss of colloidal stability, and/or formation of an intractable oily layer. The PISA process allows the synthesis of latexes without using low molecular weight surfactants avoiding the problems induced by these products Latex is an example of an emulsion polymer which is a water-based polymer dispersion. Latex paints are used for a variety of applications including interior and exterior, and flat, semi-gloss and gloss applications. Latex is a stable dispersion (colloidal emulsion) of rubber or plastic polymer microparticles in an aqueous medium. Latexes may be natural or synthetic.

PISA (Polymerization Induced Self-Assembly) as used in the process to prepare latexes allows the preparation of latexes in the absence of surfactants, by using hydrophilic macromolecular chain transfer agents instead. As a result, latexes prepared by using these hydrophilic compounds in place of traditional surfactants showed an improvement of water resistance, scrub resistance, and/or stain resistance, among other benefits.

In one embodiment, the application relates to a process for preparing an aqueous polymer dispersion, comprising providing an initial composition, which is reacted to form a seed with a first monomer and a selective hydrophilic macro-RAFT agent of formula (I), and followed by subsequent reaction with a second monomer. Specifically, the process comprises providing an initial composition comprising (i) about 0.5 to about 6 parts of a selective hydrophilic macro-RAFT agent of formula (I); (ii) about 0.1 to about 30 parts of at least one first monomer; (iii) about 0.05 to about 0.5 parts of a free radical initiator; and (iv) water. The initial composition is reacted under suitable conditions to generate a seed composition, wherein the seed composition comprises a polymer formed from the selective hydrophilic macro-RAFT agent of formula (I) and the at least one first monomer. The seed composition is combined with (i) about 0.05 to about 0.8 parts of at least one initiator; and (ii) about 0.1 to about 99 parts of at least one second monomer, under conditions suitable for reacting the seed composition with the at least one second monomer to form an aqueous polymer dispersion. In the process, the at least one first monomer and at least one second monomer are different, and the process is substantially free of surfactants.

In one embodiment, the first monomer comprises styrene monomers, acrylic monomers, vinyl ester monomers, or mixtures thereof; and the second monomer comprises vinyl ester monomers. For example, the at least one first monomer is selected from the group consisting of styrene, butyl acrylate, methacrylic acid, vinyl acetate, and mixtures thereof, and the at least one second monomer is a vinyl acetate monomer.

In another embodiment, the first monomer is selected from the group consisting of methyl methacrylate monomers, butyl acrylate monomers, and mixtures thereof; and the second monomer comprises an acrylic monomer. For example, the at least one acrylic monomers is selected from the group consisting of acrylic acid, acrylic acid esters, methacrylic acid, methacrylic acid esters, and mixtures thereof. Preferably, the at least one first monomer comprises methyl methacrylate/butyl acrylate in a ratio of about 40:60 to about 60:40, or the at least one first monomer is selected from methyl methacrylate/butyl acrylate with a ratio of about 50:50. In another aspect, the at least one first monomer is selected from a butyl acrylate/methyl methacrylate copolymer.

In another embodiment, the at least one first monomer is selected from the group consisting of styrene monomers, acrylic monomers, vinyl ester monomers, and mixtures thereof; and the second monomer is selected from the group consisting of styrene monomers, acrylic monomers, vinyl ester monomers, and mixtures thereof. Preferably, the at least one first monomer is selected from the group consisting of styrene, acrylic, vinyl ester monomers and mixtures thereof. In one aspect, the at least one second monomer is selected from the group consisting of styrene, acrylic, vinyl ester monomers and mixtures thereof. In another aspect, the styrene or acrylic monomers are selected from the group consisting of styrene, butyl acrylate, methacrylic acid, vinyl acetate, and mixtures thereof. In one aspect, the vinyl ester monomers are selected from the group consisting of styrene, butyl acrylate, methacrylic acid, vinyl acetate, and mixtures thereof. In another aspect, the acrylic monomers are selected from the group consisting of acrylic acid, acrylic acid esters, methacrylic acid, and methacrylic acid esters.

The selective hydrophilic macro-RAFT agent of formula (I) is defined as follows:

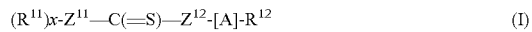

(I)

wherein:

$Z^{11}$ represents C, N, O, S or P, $Z^{12}$ represents S or P, $R^{11}$ and $R^{12}$, which may be identical or different, represent:
an optionally substituted alkyl, acyl, aryl, alkene or alkyne group (i), or
a saturated or unsaturated, optionally substituted or aromatic carbon-based ring (ii), or
a saturated or unsaturated, optionally substituted heterocycle (iii), these groups and rings (i), (ii) and (iii) possibly being substituted with substituted phenyl groups, substituted aromatic groups or groups: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, S-aryl, groups of hydrophilic or ionic nature such as the alkali metal salts of carboxylic acids, the alkali metal salts of sulphonic acid, polyalkylene oxide (PEO or PPO) chains and cationic substituents (quaternary ammonium salts), R representing an alkyl or aryl group, x corresponds to the valency of $Z^{11}$, or alternatively x is 0, in which case $Z^{11}$ represents a phenyl, alkene or alkyne radical, optionally substituted with an optionally substituted alkyl; acyl; aryl; alkene or alkyne group; an optionally substituted, saturated, unsaturated, or aromatic, carbon-based ring; an optionally substituted, saturated or unsaturated heterocycle; alkoxycarbonyl or aryloxycarbonyl (—COOR); carboxyl (COOH); acyloxy (—O$_2$CR); carbamoyl (—CONR$_2$); cyano (—CN); alkylcarbonyl; alkylarylcarbonyl; arylcarbonyl; arylalkylcarbonyl; phthalimido; succinimido; amidino; guanidimo; hydroxyl (—OH); amino (—NR$_2$); halogen; allyl; epoxy; alkoxy (—OR), S-alkyl; S-aryl groups; groups of hydrophilic or ionic nature such as the alkali metal salts of carboxylic acids, the alkali metal salts of sulphonic acid, polyalkylene oxide (PEO or PPO) chains and cationic substituents (quaternary ammonium salts); and A represents a monoblock, diblock or triblock polymer comprising at least a first block which is hydrophilic in nature and an optional second block which is hydrophobic or hydrophilic in nature.

Preferably, the selective hydrophilic macro-RAFT agent is present in an amount of about 0.5 to about 6 parts, or about 0.5 to about 3 parts. The selective hydrophilic macro-RAFT agent of formula (I) may be selected from the group consisting of PAA-Xa, PAM-Xa, PAM-PAA-Xa, PDMA-Xa, and mixtures thereof.

Preferably, the aqueous polymer dispersion is formed using polymerization induced self-assembly of a latex polymer composition.

According to the process, the latex polymer composition that is formed has a viscosity of less than 4000 cps, preferably less than 2000 cps, wherein the viscosity is determined using a Brookfield Model LVT viscometer at 30 rpm and No. 3 spindle. In another aspect, the latex polymer composition has a solids content of at least 40%, and a viscosity of less than 4000 cps, less than 3000 cps, less than 1500 cps, and less than 1000 cps, wherein the viscosity is determined using a Brookfield Model LVT viscometer at 30 rpm and No. 3 spindle. In another aspect, the latex polymer composition has a solids content of at least 50%, and a viscosity of less than 4000 cps, preferably less than 2000 cps, wherein the viscosity is determined using a Brookfield Model LVT viscometer at 30 rpm and No. 3 spindle.

This application also relates to a composition comprising a latex polymer composition obtained by the free-radical emulsion polymerization process described above.

In certain embodiments, the application relates to an adhesive composition comprising the latex polymer composition. In other embodiments, the application relates to a mastic composition comprising the latex polymer composition or a sealant composition comprising the latex polymer composition.

In a preferred embodiment, the application relates to a coating composition comprising a latex polymer composition made according to the process. For example, the coating composition may be an industrial coating or a wood coating, and preferably, the coating composition is a paint composition, preferably an architectural paint composition or a stone paint composition. Preferably the paint compositions will have good block resistance. Also, such coating compositions preferably have good scrub resistance, preferably a scrub resistance of at least 300 according to ASTM test methods, more preferably a scrub resistance that is at least about five times more than a surfactant-based latex. In another aspect, the coating compositions will have good adhesion properties, preferably good adhesion to multiple substrates such as glass and metal. In another aspect, the coating composition of claim will be water whitening resistant and/or water resistant.

In certain aspects, the coating compositions will have low viscosity and high solids content. For example, a coating composition may preferably have a viscosity of less than 4000 cps, preferably less than 2000 cps, wherein the viscosity is determined using a Brookfield Model LVT viscometer at 30 rpm and No. 3 spindle. In another aspect, a coating composition may preferably have a solids content of at least 40%, and a viscosity of less than 4000 cps, less than 3000 cps, less than 2000 cps, less than 1500 cps or less than 1000 cps, wherein the viscosity is determined using a Brookfield Model LVT viscometer at 30 rpm and No. 3 spindle. In another aspect, a coating composition may preferably have a solids content of at least 50%, and a viscosity of less than 4000 cps, preferably less than 2000 cps, wherein the viscosity is determined using a Brookfield Model LVT viscometer at 30 rpm and No. 3 spindle.

Preferably the latexes produced according to this application will have good mechanical stability, electrolyte ($CaCl_2$) stability, freeze thaw stability, adhesion and low to zero foam.

Latex paint formulations typically comprise additives, e.g., at least one pigment. In a preferred embodiment of the invention the latex paint formulation includes at least one pigment selected from the group consisting of $TiO_2$, $CaCO_3$, clay, aluminum oxide, silicon dioxide, magnesium oxide, sodium oxide, potassium oxide, talc, barytes, zinc oxide, zinc sulfite and mixtures thereof. More preferably the at least one pigment includes $TiO_2$, calcium carbonate or clay.

In addition to the above components, the aqueous coating composition can include one or more additives selected from the group consisting of dispersants, defoamers, biocides, mildewcides, colorants, waxes, perfumes and co-solvents.

Compositions of the present invention may have an absence of one or more of anionic surfactant, cationic surfactant, nonionic surfactant, zwitterionic surfactant, and/ or amphoteric surfactant.

These and other features and advantages of the present invention will become more readily apparent to those skilled in the art upon consideration of the following detailed description, which describe both the preferred and alternative embodiments of the present invention.

DETAILED DESCRIPTION OF INVENTION

As used herein, the term "alkyl" means a saturated straight chain, branched chain, or cyclic hydrocarbon radical, including but not limited to, methyl, ethyl, n-propyl, iso-propyl, n-butyl, sec-butyl, t-butyl, pentyl, n-hexyl, cyclohexyl, and 2-ethylhexyl.

As used herein, the term "aryl" means a monovalent unsaturated hydrocarbon radical containing one or more six-membered carbon rings in which the unsaturation may be represented by three conjugated double bonds, which may be substituted with one or more of carbons of the ring with hydroxy, alkyl, alkenyl, halo, haloalkyl, or amino, including but not limited to phenoxy, phenyl, methylphenyl, dimethylphenyl, trimethylphenyl, chlorophenyl, trichloromethylphenyl, aminophenyl, and tristyrylphenyl.

As used herein, the term "alkylene" means a divalent saturated straight or branched chain hydrocarbon radical, such as for example, methylene, dimethylene, and trimethylene.

As used herein, the terminology "$(C_r-C_s)$" in reference to an organic group, wherein r and s are each integers, indicates that the group may contain from r carbon atoms to s carbon atoms per group.

As used herein the term "(meth)acrylate" refers collectively and alternatively to the acrylate and methacrylate and the term "(meth)acrylamide" refers collectively and alternatively to the acrylamide and methacrylamide, so that, for example, "butyl (meth)acrylate" means butyl acrylate and/or butyl methacrylate.

As used herein, "molecular weight" in reference to a polymer or any portion thereof, means to the weight-average molecular weight ("Mw") of the polymer or portion. Mw of a polymer is a value measured by gel permeation chromatography (GPC) with an aqueous eluent or an organic eluent (for example dimethylacetamide, dimethylformamide, and the like), depending on the composition of the polymer, light scattering (DLS or alternatively MALLS), viscometry, or a number of other standard techniques. Mw of a portion of a polymer is a value calculated according to known techniques from the amounts of monomers, polymers, initiators and/or transfer agents used to make the portion.

As used herein, each of the terms "monomer", "polymer", "homopolymer", "copolymer", "linear polymer", "branched polymer", "block copolymer", "graft copolymer", etc. have the meaning ascribed to it in Glossary of basic terms in polymer science (IUPAC Recommendations 1996), Pure Appl. Chem., Vol. 68, No. 12, pp. 2287-2311, 1996.

As used herein, the indication that a radical may be "optionally substituted" or "optionally further substituted" means, in general, unless further limited, either explicitly or by the context of such reference, such radical may be substituted with one or more inorganic or organic substituent groups, for example alkyl, alkenyl, aryl, arylalkyl, alkaryl, a hetero atom, or heterocyclyl, or with one or more functional groups capable of coordinating to metal ions, such as hydroxyl, carbonyl, carboxyl, amino, imino, amido, phosphonic acid, sulphonic acid, or arsenate, or inorganic and organic esters thereof, such as, for example, sulphate or phosphate, or salts thereof.

As used herein, "parts," "parts by weight" or "pbw" in reference to a named compound refers to the amount of the named compound, exclusive, for example, of any associated solvent.

As used herein, an indication that a composition is "substantially free" of a specific material, means the composition contains no more than an insubstantial amount of that material, and an "insubstantial amount" means an amount that does not measurably affect the desired properties of the composition.

As used herein, the term "surfactant" means a compound that reduces surface tension when dissolved in water.

As used herein, suitable polymerizable functional groups include, for example, acrylo, methacrylo, acrylamido, methacrylamido, diallylamino, allyl ether, vinyl ether, α-alkenyl, maleimido, styrenyl, and a-alkyl styrenyl groups.

As used herein, the term "Macro CTA" means the structure according to formula (I), below.

Latex (emulsion polymer) is used commonly and widely in paints and coatings, adhesives, sealants and elastomeric applications. Typical preparation for the industrial production of latex polymers involves the use of monomers from styrene, butyl acrylate, and ethyl hexyl acrylate to vinyl acetate to gaseous monomers such as ethylene, plus typical initiators such as ammonium persulfate etc. and surfactants to stabilize the latex particles ranging from 40 to 500 nm (typically 80-250 nm).

The amount of surfactant used to make the latex can range between 1-3% based on the total amount of monomers. Surfactants are used to not only control the particle size but also to provide shear stability and therefore play a crucial in preparation of latexes and long term shelf stability of the latex.

However, such use of surfactants are at times outweighed by the need to minimize the surfactant levels to obtain films of latex that can give excellent water resistance together with adhesion to substrates. The importance of eliminating or reducing surfactants therefore becomes critical and more critical in paint films (with low or high PVC) as the presence of surfactants tends to diminish the aesthetic appearance of the paint film (blistering, leaching, craters etc.).

To improve the water resistance of latex films and that of paint films in particular especially for latex polymers based on co-polymers of vinyl acetate, or co-polymers of styrene acrylates, the usage of surfactant has been minimized or attempts have been made using polymerizable surfactants. In both cases results have not been satisfactory in obtaining good water resistance or other performance properties.

In one embodiment, the use of the Macro CTA as described herein (hydrophilic precursors with Xanthate moiety) in emulsion polymerization of latexes, in particular latex polymers of vinyl acetate with other co-monomers and also of styrene with other co-monomers have been prepared to yield stable latexes with particle size ranging from 80-200 nm. Films of the latex polymers show surprisingly exceptional water resistance as measured through a variety of test methods for water resistance namely the water droplet, water immersion and water vapor tests. The films of the above prepared latex with Macro CTA for example were tested by the water immersion test by soaking the film of the latex in water for up to 8 days and monitoring for blushing (whiteness) or any other film defects, and by the water vapor method for an hour against film of commercial latexes and latexes produced using standard surfactants.

The film of latex based on commercial latex and those with surfactants prepared in the laboratory blush after 24 hours and the blush (whiteness) of the film becomes progressively deeper over time while the film of latex based on co-polymers of vinyl acetate or styrene acrylic show no tendency toward whiteness even after 8 days of allowing the films to soak in water.

Latexes prepared using Macro CTA and based on co-polymers of vinyl acetate and those of co-monomers with styrene—compared to latexes based on surfactants—have shown enhanced shear stability, freeze thaw and electrolyte stability and films of the latex show enhanced adhesion to metallic substrate.

The above prepared latex with Macro CTA containing Xanthate moiety of invention can easily be scaled for commercial purposes. The preparation of the seed of above latex polymers (vinyl acetate co-polymers and or of styrene copolymers), which is part of the preparation in making latexes of high solids are also desirable.

The described Macro CTAs and the array of Macro CTA with the use of specialty monomers that are available allow for tailoring of latexes for various performances and multi-functional performance and thereby extending the application beyond just paints and coating applications, which include but are not limited to coatings, adhesives, sealants, elastomeric applications, and the like.

The latex of the present invention comprises, in dispersion, a water-insoluble polymer obtained from monomers comprising ethylenic unsaturation. The monomers as mentioned herein can be used as ethylenically unsaturated monomers involved in the production of the latex. Latexes with modified surface properties, which can be obtained using a method which comprises addition of a water-soluble amphiphilic copolymer to an aqueous dispersion of a water-insoluble polymer or copolymer obtained from monomers with ethylenic unsaturation.

In one embodiment, the latexes can be used as binding agents in various applications in the fields of paint, paper-making coating, coatings and construction materials.

In one embodiment, a non-surfactant copolymer can be obtained through the choice of monomers, for example the Styrene/BA copolymer is non-surfactant. It is also possible to obtain a non-surfactant block copolymer by increasing the molecular mass or by decreasing the fraction of hydrophobic monomers in the copolymer.

In general, the water-soluble amphiphilic block copolymers described above can be obtained by any polymerization process referred to as "living" or "controlled", such as, for example: free-radical polymerization controlled by xanthates, according to the teaching of application WO 98/58974, free-radical polymerization controlled by dithioesters, according to the teaching of application WO 97/01478, polymerization using nitroxide precursors, according to the teaching of application WO 99/03894, free-radical polymerization controlled by dithiocarbamates, according to the teaching of application WO 99/31144, and/or atom transfer free-radical polymerization (ATRP), according to the teaching of application WO 96/30421.

The term "Macro CTA" or selective hydrophilic macro-RAFT agent of formula (I) is defined as follows:

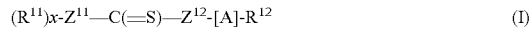

in which formula:
$Z^{11}$ represents C, N, O, S or P,
$Z^{12}$ represents S or P,
$R^{11}$ and $R^{12}$, which may be identical or different, represent:
an optionally substituted alkyl, acyl, aryl, alkene or alkyne group (i), or
a saturated or unsaturated, optionally substituted or aromatic carbon-based ring (ii), or
a saturated or unsaturated, optionally substituted heterocycle (iii), these groups and rings (i), (ii) and (iii) possibly being substituted with substituted phenyl groups, substituted aromatic groups or groups: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, S-aryl, groups of hydrophilic or ionic nature such as the alkali metal salts of carboxylic acids, the alkali metal salts of sulphonic acid, polyalkylene oxide (PEO or PPO) chains and cationic substituents (quaternary ammonium salts), R representing an alkyl or aryl group,
x corresponds to the valency of $Z^{11}$, or alternatively
x is 0, in which case $Z^{11}$ represents a phenyl, alkene or alkyne radical, optionally substituted with an optionally substituted alkyl; acyl; aryl; alkene or alkyne group; an optionally substituted, saturated, unsaturated, or aromatic, carbon-based ring; an optionally substituted, saturated or unsaturated heterocycle; alkoxycarbonyl or aryloxycarbonyl (—COOR); carboxyl (COOH); acyloxy (—O$_2$CR); carbamoyl (—CONR$_2$); cyano (—CN); alkylcarbonyl; alkylarylcarbonyl; arylcarbonyl; arylalkylcarbonyl; phthalimido; maleimido; succinimido; amidino; guanidimo; hydroxyl (—OH); amino (—NR$_2$); halogen; allyl; epoxy; alkoxy (—OR), S-alkyl; S-aryl groups; groups of hydrophilic or ionic nature such as the alkali metal salts of carboxylic acids, the alkali metal salts of sulphonic acid, polyalkylene oxide (PEO or PPO) chains and cationic substituents (quaternary ammonium salts); and A represents a monoblock, diblock or triblock polymer, preferably A represents a monoblock, diblock or triblock polymer comprising at least a first block which is hydrophilic in nature and an optional second block which is hydrophobic or hydrophilic in nature.

According to one advantageous variant of the invention, the compound of formula (I) is such that $Z^{11}$ is an oxygen atom and $Z^{12}$ is a sulphur atom. These compounds are thus functionalized at the end of the chain with xanthates.

As regards the polymer A, it corresponds more particularly to at least one of the three formulae below:

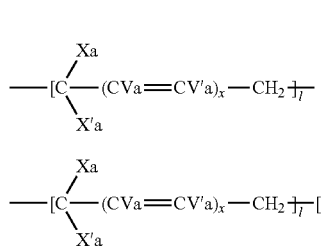
(AI)

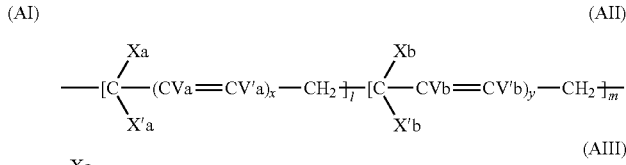
(AII)

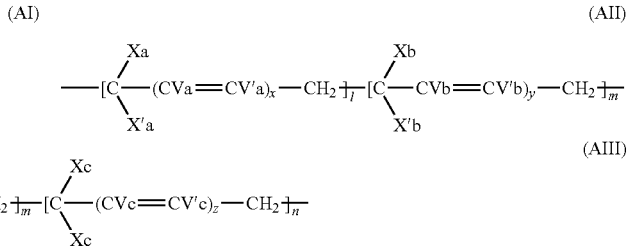
(AIII)

in which formulae:
Va, V'a, Vb, V'b, Vc and V'c, which may be identical or different, represent: H, an alkyl group or a halogen,
Xa, X'a, Xb, X'b, Xc and X'c, which may be identical or different, represent H, a halogen or a group R, OR, OCOR, NHCOH, OH, NH2, NHR, N(R)$_2$, (R)$_2$N$^+$O$^-$, NHCOR, CO$_2$H, CO$_2$R, CN, CONH$_2$, CONHR or CONR$_2$, in which R, which may be identical or different, are chosen from alkyl, aryl, aralkyl, alkaryl, alkene and organosilyl groups, optionally perfluorinated and optionally substituted with one or more carboxyl, epoxy, hydroxyl, alkoxy, amino, halogen or sulphonic groups,
l, m and n, which may be identical or different, are greater than or equal to 1,
x, y and z, which may be identical or different, are equal to 0 or 1.

More particularly, the polymer A is obtained by using at least one ethylenically unsaturated monomer chosen from hydrophilic monomers.

Examples of such monomers that may especially be mentioned include at least one of: (i) ethylenically unsaturated monocarboxylic and dicarboxylic acids, for instance acrylic acid, methacrylic acid, itaconic acid, maleic acid or fumaric acid; (ii) monoalkyl esters of dicarboxylic acids of the type mentioned with alkanols preferably containing 1 to 4 carbon atoms, and N-substituted derivatives thereof, such as, 2-hydroxyethyl acrylate or methacrylate; (iii) unsaturated carboxylic acid amides, for instance acrylamide or methacrylamide; (iv) ethylenic monomers comprising a sulphonic acid group and ammonium or alkali metal salts thereof, for example vinylsulphonic acid, vinylbenzenesulphonic acid, a-acrylamidomethyl propanesulphonic acid or 2-sulphoethylene methacrylate; (v) vinyl phosphonic acid, and (vi) vinyl sulphonate and salts thereof.

It is possible to incorporate into the polymer composition a proportion of hydrophobic monomers, provided that the solubility/dispersity conditions and the conditions of non-formation of gelled or non-gelled micelles, mentioned previously, remain valid.

Illustrations of hydrophobic monomers that may especially be mentioned include styrene or its derivatives, butadiene, chloroprene, (meth)acrylic esters, vinyl esters and vinyl nitriles.

The term "(meth)acrylic esters" denotes esters of acrylic acid and of methacrylic acid with hydrogenated or fluorinated $C_1$-$C_{12}$ and preferably $C_1$-$C_8$ alcohols. Among the compounds of this type that may be mentioned are: methyl acrylate, ethyl acrylate, propyl acrylate, n-butyl acrylate, isobutyl acrylate, 2-ethylhexyl acrylate, t-butyl acrylate, methyl methacrylate, ethyl methacrylate, n-butyl methacrylate, isobutyl methacrylate.

The vinyl nitriles more particularly include those containing from 3 to 12 carbon atoms, such as, in particular, acrylonitrile and methacrylonitrile.

It should be noted that the styrene may be totally or partially replaced with derivatives such as a-methylstyrene or vinyltoluene.

The other ethylenically unsaturated monomers that may be used, alone or as mixtures, or that are copolymerizable with the above monomers are especially: vinyl esters of a carboxylic acid, for instance vinyl acetate, vinyl versatate or vinyl propionate; vinyl halides; vinylamine amides, especially vinylformamide or vinylacetamide; ethylenically unsaturated monomers comprising a secondary, tertiary or quaternary amino group, or a heterocyclic group containing nitrogen, such as, for example, vinylpyridines, vinylimidazole, aminoalkyl (meth)acrylates and aminoalkyl(meth) acrylamides, for instance dimethylaminoethyl acrylate or methacrylate, di-tert-butylaminoethyl acrylate or methacrylate, dimethylaminomethylacrylamide or dimethylaminomethylmethacrylamide. It is likewise possible to use zwitterionic monomers such as, for example, sulphopropyl (dimethyl)aminopropyl acrylate.

According to one particularly advantageous embodiment, the polymer A is a monoblock or a diblock polymer.

It should moreover be noted that the polymer A more particularly has a number-average molar mass of less than 20,000 and preferably less than 10,000. In one embodiment, polymer A has a number-average molar mass of between about 1,000 to about 7,000. These molar masses are measured by size exclusion chromatography, using polyethylene glycol as standard.

In one embodiment, the polymer A or the Macro CTA has a weight average molecular weight of less than 30,000, typically less than 15,000. In one embodiment, polymer A or the Macro CTA has a weight average molecular weight of between about 1,500 to about 10,000.

According to a second embodiment of the invention, the monoblock, diblock or triblock polymer used is a polymer corresponding to the following formulae:

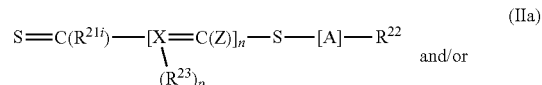
(IIa)

and/or

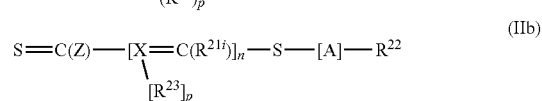
(IIb)

in which formulae:

X represents an atom chosen from N, C, P and Si, $R^2$ represents:
- an optionally substituted alkyl, acyl, aryl, alkene or alkyne group (i), or a saturated or unsaturated, optionally substituted or aromatic carbon-based ring (ii), or
- a saturated or unsaturated, optionally substituted or aromatic heterocycle (iii), these groups and rings (i), (ii) and (iii) possibly being substituted with substituted phenyl groups, substituted aromatic groups or groups: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, S-aryl, organosilyl, groups of hydrophilic or ionic nature such as the alkali metal salts of carboxylic acids, the alkali metal salts of sulphonic acid, polyalkylene oxide (PEO or PPO) chains and cationic substituents (quaternary ammonium salts), R representing an alkyl or aryl group, Z, $R^{21i}$ and $R^{23}$, which may be identical or different, are chosen from:
- a hydrogen atom,
- an optionally substituted alkyl, acyl, aryl, alkene or alkyne group,
- a saturated or unsaturated, optionally substituted or aromatic carbon-based ring,
- a saturated or unsaturated, optionally substituted heterocycle, alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR2), halogen, allyl, epoxy, alkoxy (—OR), S-alkyl, S-aryl and organosilyl groups, R representing an alkyl or aryl group,
- groups of hydrophilic or ionic nature such as the alkali metal salts of carboxylic acids, the alkali metal salts of sulphonic acid, polyalkylene oxide (PEO or PPO) chains and cationic substituents (quaternary ammonium salts);

n>0, i ranges from 1 to n, p is equal to 0, 1 or 2 depending on the valency of X, and also if X═C, then Z is not an S-alkyl or S-aryl group, the group $R^{1i}$, where i=n, is not an S-alkyl or S-aryl group, and A represents a monoblock, diblock or triblock polymer as defined herein.

In order to obtain water-soluble amphiphilic copolymers comprising hydrophilic and hydrophobic blocks, this process consists in forming a first block according to the following steps:

(1) bringing into contact:
- at least one ethylenically unsaturated monomer,
- at least one source of free radicals, and
- at least one compound of formula (I) as described herein;

(2) forming a second block by repeating step 1 using: monomers which are different in nature, and in place of the precursor compound of formula (I), the polymer derived from step 1; and (3) optionally hydrolyzing, at least partially, the copolymer obtained.

During step 1, a first block of the polymer is synthesized which is mainly hydrophilic or hydrophobic in nature depending on the nature and the amount of the monomers used. During step 2, the other block of the polymer is synthesized.

The ethylenically unsaturated monomers can be chosen from the hydrophilic, hydrophobic and hydrolyzable monomers defined herein, in proportions suitable for obtaining a block copolymer in which the blocks exhibit the characteristics defined above.

According to this process, if all the successive polymerizations are carried out in the same reactor, it is generally preferable for all the monomers used in a step to be consumed before the polymerization of the subsequent step begins, therefore before the new monomers are introduced. However, it may so happen that the hydrophobic or hydrophilic monomers of the preceding step are still present in the reactor during the polymerization of the subsequent block. In this case, these monomers generally represent no more than 5 mol % of all the monomers and they participate in the polymerization by contributing to the introduction of the hydrophobic or hydrophilic units into the subsequent block.

A water-soluble amphiphilic copolymer comprising blocks which are hydrophilic in nature and which are hydrophobic in nature can be obtained from a single type of hydrophobic hydrolyzable monomer. In this case, step 2 is no longer necessary, but partial hydrolysis of the polymer is then essential.

Using the same process, it is possible to obtain a copolymer comprising n blocks by repeating the preceding steps 1 and 2, but replacing the compound of formula (I) with the copolymer comprising n−1 blocks.

In one embodiment, the copolymers obtained by the processes described above generally exhibit a polydispersity index of at most 2, typically of at most 1.5. It may be desired to mix with the latex blocks whose polydispersity is controlled. In this case, it is possible to mix, in precise proportions, several water-soluble amphiphilic copolymers comprising a block which is hydrophilic in nature and a block which is hydrophobic in nature, each having a clearly defined molecular mass.

In one embodiment, described herein are methods of preparing an aqueous coating composition by mixing together at least one latex polymer derived from at least one monomer and the Macro CTA as described herein and at least one pigment. Preferably, the latex polymer is in the form of latex polymer dispersion. The additives discussed above can be added in any suitable order to the latex polymer, the pigment, or combinations thereof, to provide these additives in the aqueous coating composition. In the case of paint formulations, the aqueous coating composition preferably has a pH of from 7 to 10. Preferably, the paint shows improved block resistance and stain resistance. In one embodiment, the coating composition can optionally be thickened to about 85-125 KU. In another embodiment, the coating composition can be thickened above 85 KU. In yet another embodiment, the coating composition can be thickened to about 90-120 KU.

In formulating latexes and latex paints/coatings, physical properties that may be considered include, but are not limited to, viscosity versus shear rate, ease of application to surface, spreadability, and shear thinning.

When hydrolyzable hydrophobic monomers are used, the hydrolysis may be carried out using a base or an acid. The base can be chosen from alkali metal or alkaline earth metal hydroxides, such as sodium hydroxide or potassium hydroxide, alkali metal alkoxides, such as sodium methoxide, sodium ethoxide, potassium methoxide, potassium ethoxide or potassium t-butoxide, ammonia and amines, such as triethylamines. The acids can be chosen from sulfuric acid, hydrochloric acid and para-toluenesulfonic acid. Use may also be made of an ion-exchange resin or an ion-exchange membrane of the cationic or anionic type. The hydrolysis is generally carried out at a temperature of between 5 and 100° C., preferably between 15 and 90° C. Preferably, after hydrolysis, the block copolymer is washed, for example by dialysis against water or using a solvent such as alcohol. It may also be precipitated by lowering the pH below 4.5.

The hydrolysis may be carried out on a single-block polymer, which will subsequently be associated with other blocks, or on the final block polymer.

The latex of the present invention comprises, in dispersion, a water-insoluble polymer obtained from monomers comprising ethylenic unsaturation. All the monomers which had been mentioned in the context of the definition of the water-soluble amphiphilic copolymer can be used as monomers comprising ethylenic unsaturations involved in the production of the latex. Reference may therefore be made to this part of the description for choosing a useful monomer comprising ethylenic unsaturation.

The monomers typically employed in emulsion polymerization to make latex for latex paint include, but are not limited to such monomers as methyl acrylate, ethyl acrylate, methyl methacrylate, butyl acrylate, 2-ethyl hexyl acrylate, other acrylates, methacrylates and their blends, acrylic acid, methacrylic acid, styrene, vinyl toluene, vinyl acetate, vinyl esters of higher carboxylic acids than acetic acid, e.g. vinyl versatate, acrylonitrile, acrylamide, butadiene, ethylene, vinyl chloride and the like, and mixtures thereof. This is further discussed below in the section entitled "Latex Monomers".

In one embodiment, the latex monomers fed to a reactor to prepare the polymer latex binder preferably include at least one acrylic monomer selected from the group consisting of acrylic acid, acrylic acid esters, methacrylic acid, and methacrylic acid esters. In addition, the monomers can include styrene, vinyl acetate, or ethylene. The monomers can also include one or more monomers selected from the group consisting of styrene, (alpha)-methyl styrene, vinyl chloride, acrylonitrile, methacrylonitrile, uredo methacrylate, vinyl acetate, vinyl esters of branched tertiary monocarboxylic acids (e.g. vinyl esters commercially available under the mark VEOVA from Shell Chemical Company or sold as EXXAR neo vinyl esters by ExxonMobil Chemical Company), itaconic acid, crotonic acid, maleic acid, fumaric acid, and ethylene. It is also possible to include $C_4$-$C_8$ conjugated dienes such as 1,3-butadiene, isoprene or chloroprene. Commonly used monomers in making acrylic paints are butyl acrylate, methyl methacrylate, ethyl acrylate and the like. Preferably, the monomers include one or more monomers selected from the group consisting of n-butyl acrylate, methyl methacrylate, styrene and 2-ethylhexyl acrylate.

The latex polymer is typically selected from the group consisting of pure acrylics (comprising acrylic acid, methacrylic acid, an acrylate ester, and/or a methacrylate ester as the main monomers); styrene acrylics (comprising styrene and acrylic acid, methacrylic acid, an acrylate ester, and/or a methacrylate ester as the main monomers); vinyl acrylics (comprising vinyl acetate and acrylic acid, methacrylic acid, an acrylate ester, and/or a methacrylate ester as the main monomers); and acrylated ethylene vinyl acetate copolymers (comprising ethylene, vinyl acetate and acrylic acid, methacrylic acid, an acrylate ester, and/or a methacrylate ester as the main monomers).

In one embodiment, the latex polymer comprises:
(a) a first monomer that comprises styrene monomers, acrylic monomers, vinyl ester monomers, or mixtures thereof; and
(b) a second monomer that comprises vinyl ester monomers.

For example, the at least one first monomer is selected from the group consisting of styrene, butyl acrylate, methacrylic acid, vinyl acetate, and mixtures thereof, and the at least one second monomer is a vinyl acetate monomer.

In another embodiment, the latex polymer comprises:
(a) a first monomer that is selected from the group consisting of methyl methacrylate monomers, butyl acrylate monomers, and mixtures thereof; and
(b) a second monomer that comprises an acrylic monomer.

For example, the at least one acrylic monomers is selected from the group consisting of acrylic acid, acrylic acid esters, methacrylic acid, methacrylic acid esters, and mixtures thereof. Preferably, the at least one first monomer comprises methyl methacrylate/butyl acrylate in a ratio of about 40:60 to about 60:40, or the at least one first monomer is selected from methyl methacrylate/butyl acrylate with a ratio of about 50:50. In another aspect, the at least one first monomer is selected from a butyl acrylate/methyl methacrylate copolymer.

In another embodiment, the latex polymer comprises:
(a) at least one first monomer that is selected from the group consisting of styrene monomers, acrylic monomers, vinyl ester monomers, and mixtures thereof; and
(b) a second monomer that is selected from the group consisting of styrene monomers, acrylic monomers, vinyl ester monomers, and mixtures thereof.

Preferably, the at least one first monomer is selected from the group consisting of styrene, acrylic, vinyl ester monomers and mixtures thereof. In one aspect, the at least one second monomer is selected from the group consisting of styrene, acrylic, vinyl ester monomers and mixtures thereof. In another aspect, the styrene or acrylic monomers are selected from the group consisting of styrene, butyl acrylate, methacrylic acid, vinyl acetate, and mixtures thereof. In one aspect, the vinyl ester monomers are selected from the group consisting of styrene, butyl acrylate, methacrylic acid, vinyl acetate, and mixtures thereof. In another aspect, the acrylic monomers are selected from the group consisting of acrylic acid, acrylic acid esters, methacrylic acid, and methacrylic acid esters.

In typical acrylic paint compositions the polymer is comprised of one or more esters of acrylic or methacrylic acid, typically a mixture, e.g., about 50/50 by weight, of a high $T_g$ monomer (e.g. methyl methacrylate) and a low Tg monomer (e.g., butyl acrylate), with small proportions, e.g., about 0.5% to about 2% by weight, of acrylic or methacrylic acid. The vinyl-acrylic paints usually include vinyl acetate and butyl acrylate and/or 2-ethyl hexyl acrylate and/or vinyl versatate. In vinyl-acrylic paint compositions, at least 50% of the polymer formed is comprised of vinyl acetate, with the remainder being selected from the esters of acrylic or methacrylic acid. The styrene/acrylic polymers are typically similar to the acrylic polymers, with styrene substituted for all or a portion of the methacrylate monomer thereof.

The latex polymer dispersion preferably includes from about 30 to about 75% solids and a mean latex particle size of from about 70 to about 650 nm. The latex polymer is preferably present in the aqueous coating composition in an amount from about 5 to about 60 percent by weight, and more preferably from about 8 to about 40 percent by weight (i.e. the weight percentage of the dry latex polymer based on the total weight of the coating composition).

The aqueous coating composition is a stable fluid that can be applied to a wide variety of materials such as, for example, paper, wood, concrete, metal, glass, ceramics, plastics, plaster, and roofing substrates such as asphaltic coatings, roofing felts, foamed polyurethane insulation; or to previously painted, primed, undercoated, worn, or weathered substrates. The aqueous coating composition of the invention can be applied to the materials by a variety of techniques well known in the art such as, for example, brush, rollers, mops, air-assisted or airless spray, electrostatic spray, and the like.

Liquid Carrier

In one embodiment, the composition of the present invention (for example paints or stains) comprises the selected polymer and a liquid carrier.

In one embodiment, the liquid carrier is an aqueous carrier comprising water and the treatment solution is in the form of a solution, emulsion, or dispersion of the material and additives. In one embodiment, the liquid carrier comprises water and a water miscible organic liquid. Suitable water miscible organic liquids include saturated or unsaturated monohydric alcohols and polyhydric alcohols, such as, for example, methanol, ethanol, isopropanol, cetyl alcohol, benzyl alcohol, oleyl alcohol, 2-butoxyethanol, and ethylene glycol, as well as alkylether diols, such as, for example, ethylene glycol monoethyl ether, propylene glycol monoethyl ether and diethylene glycol monomethyl ether.

As used herein, terms "aqueous medium" and "aqueous media" are used herein to refer to any liquid medium of which water is a major component. Thus, the term includes water per se as well as aqueous solutions and dispersions.

In one embodiment, the latex polymer composition is in the form of an aqueous polymer dispersion, typically having a solids content based on the total weight of the polymer dispersion, of up to about 60 wt % and, more typically about 20 to about 50 wt %. In preferred embodiments, the compositions have high solids content, while having a low viscosity. For example, according to the process, the latex polymer composition that is formed has a viscosity of less than 4000 cps, preferably less than 2000 cps, wherein the viscosity is determined using a Brookfield Model LVT viscometer at 30 rpm and No. 3 spindle. In another aspect, the latex polymer composition has a solids content of at least 40%, and a viscosity of less than 4000 cps, less than 3000 cps, less than 2000 cps, less than 1500 cps, or less than 1000 cps wherein the viscosity is determined using a Brookfield Model LVT viscometer at 30 rpm and No. 3 spindle. In another aspect, the latex polymer composition has a solids content of at least 50%, and a viscosity of less than 4000 cps, less than 3000 cps, less than 2000 cps, less than 1500 cps, or less than 1000 cps wherein the viscosity is determined using a Brookfield Model LVT viscometer at 30 rpm and No. 3 spindle.

EXPERIMENTS

Example 1

De-ionized water (340 g) and the Macro CTA, PAA-Xa (Polyacrylic acid xanthate, 40.14% solids) (11.68 g) [1.5% based on total monomer], were added to a suitable reactor for emulsion polymerization equipped with agitation, heating and cooling means with a slow continuous nitrogen purge. Adjusted the pH of the CTA solution with ammonia (29%) to pH 6 to 6.2 (total 3.05 g ammonia was used). Under continuous agitation, the temperature of the reactor was raised to a constant temperature of 68° C. Then a monomer mixture (15.625 g) [5.0% of a total 312.5 g of the monomer prepared by mixing of vinyl acetate (250 g), butyl acrylate (62.5 g) at VA/BA ratio of 80/20] was added to the reactor.

One minute later, a solution of ammonium persulfate [one third of the total solution of ammonium persulfate (0.957 g) dissolved in deionized water (30 g)] was added. The seed was kept at 68° C. for 60 minutes. There was no observable change in color (bluish); however a slight exotherm of 1-2° C. was noticeable. A small sample was removed to check for particle size. Then continuous addition of the remaining monomer mixture (296.875 g) and the initiator ammonium persulfate solution was set to finish in 3 hours. A small sample was removed to check the solids.

Hold the reactor at 68° C. for another one hour. Solids content was checked at this point and if the reaction was completed, the reactor was cooled below 40° C. and the resulting latex was filtered through a 136 um polyester filter.

The polymer dispersion obtained had a solid content of 44.9%, viscosity of 2344 cps, and the average particle size was 147.1 d·nm.

Example 2

De-ionized water (352 g) and the Macro CTA, PAA-Xa (Polyacrylic acid xanthate, 40.14% solids) (11.77 g) [1.5% based on total monomer], were added to a suitable reactor for emulsion polymerization equipped with agitation, heating and cooling means with a slow continuous nitrogen purge. Adjusted the pH of the CTA solution with ammonia (29%) to pH 6 to 6.2 (total 3.05 g ammonia was used). Under continuous agitation, the temperature of the reactor was raised to constant temperature of 70° C. Then a monomer mixture of styrene (7.88 g) and butyl acrylate (7.88 g) [5.0% of the total monomer] was added to the reactor.

One minute later, a solution of ammonium persulfate [half of the total solution of ammonium persulfate (1.29 g) dissolved in deionized water (30 g)] was added. The seed was kept at 70° C. for 10 minutes, then the temperature was increased to 83° C. and kept at 83° C. for 50 minutes. A small sample was removed to check for particle size. After that the temperature was decreased to 70° C. Then the continuous addition of the monomer mixture of vinyl acetate (239.4 g) and butyl acrylate (59.85 g) and the initiator ammonium persulfate solution was set to finish in 3 hours. A small sample was removed to check the solids.

Hold the reactor at 70° C. for another one hour. Solids content was checked at this point and if the reaction was completed, the reactor was cooled below 40° C. and the resulting latex was filtered through a 136 um polyester filter.

The polymer dispersion obtained had a solid content of 45.15%, viscosity of 400 cps, and the average particle size was 175.9 d·nm.

Example 3

De-ionized water (352 g) and the Macro CTA, PAA-Xa (Polyacrylic acid xanthate, 40.14% solids) (11.77 g) [1.5% based on total monomer], were added to a suitable reactor for emulsion polymerization equipped with agitation, heating and cooling means with a slow continuous nitrogen purge. Adjusted the pH of the CTA solution with ammonia (29%) to pH 6 to 6.2 (total 3.05 g ammonia was used). Under continuous agitation, the temperature of the reactor was raised to constant temperature of 70° C. Then a monomer butyl acrylate (15.76 g) [5.0% of the total monomer] was added to the reactor. One minute later, a solution of ammonium persulfate [half of the total solution of ammonium persulfate (1.29 g) dissolved in deionized water (30 g)] was added. The seed was kept at 70° C. for 10 minutes, then the temperature was increased to 83° C. and kept at 83° C. for 50 minutes. A small sample was removed to check for particle size. After that the temperature was decreased to 70° C. Then the continuous addition of the monomer mixture of vinyl acetate (239.4 g) and butyl acrylate (59.85 g) and the initiator ammonium persulfate solution was set to finish in 3 hours. A small sample was removed to check the solids.

Hold the reactor at 70° C. for another one hour. Solids content was checked at this point and if the reaction was completed, the reactor was cooled below 40° C. and the resulting latex was filtered through a 136 um polyester filter.

The polymer dispersion obtained had a solid content of 44.55%, viscosity of 152 cps, and the average particle size was 180 d·nm.

Example 4

De-ionized water (352 g) and the Macro CTA, PAA-Xa (Polyacrylic acid xanthate, 40.14% solids) (11.77 g) [1.5% based on total monomer], were added to a suitable reactor for emulsion polymerization equipped with agitation, heating and cooling means with a slow continuous nitrogen purge. Adjusted the pH of the CTA solution with ammonia (29%) to pH 6 to 6.2 (total 3.05 g ammonia was used). Under continuous agitation, the temperature of the reactor was raised to constant temp of 70° C. Then a monomer mixture of methyl methacrylate (7.88 g) and butyl acrylate (7.88 g) [5.0% of the total monomer] was added to the reactor. One minute later, a solution of ammonium persulfate [half of the total solution of ammonium persulfate (1.29 g) dissolved in deionized water (30 g)] was added. The seed was kept at 70° C. for 10 minutes, then the temperature was increased to 83° C. and kept at 83° C. for 50 minutes. A small sample was removed to check for particle size. After that the temperature was decreased to 70° C. Then the continuous addition of the monomer mixture of vinyl acetate (239.4 g) and butyl acrylate (59.85 g) and the initiator ammonium persulfate solution was set to finish in 3 hours. A small sample was removed to check the solids.

Hold the reactor at 70° C. for another one hour. Solids content was checked at this point and if the reaction was completed, the reactor was cooled below 40° C. and the resulting latex was filtered through a 136 um polyester filter.

The polymer dispersion obtained had a solid content of 45.45%, viscosity of 223 cps, and the average particle size was 159.4 d·nm.

Examples 5a-5 h

Examples 5a-5 h latexes were prepared by following the same procedure described above, and the properties of these latexes are listed the Table 1.

Comparative Example 1

Deionized water and the macro CTA pAA-Xa (Polyacrylic acid xanthate, 40.37% solids) [1.1% based on the total monomer] were mixed under high agitation and neutralized to a pH of 6.20 with a solution of ammonium hydroxide (20% solution). The mixture was added to a suitable reactor for emulsion polymerization equipped with agitation, heating and cooling means and a slow continuous nitrogen purge. Under continuous agitation, the temperature of the reactor was raised and a monomer mixture [monomer prepared by mixing of vinyl acetate and butyl acrylate] was added to the reactor. Once the temperature of the reactor had stabilized, a solution of ammonium persulfate was added to the reactor. Blue coloration was observed within five minutes.

The seed was kept at constant temperature for 30 minutes. A small sample was removed to check for particle size. The remaining monomers were continuously fed in 3 hours along with a macro CTA feed [1.4% based on the total monomer prepared by mixing pAA-Xa (40.37% solids) and deionized water with ammonium hydroxide set to complete in 1 hour 30 minutes.

When the monomer addition was finished, a small sample of aqueous polymer dispersion was obtained to do a solid content. If the solid content has reached to theoretical solid, then the reaction was cooled to about 40° C., and the resulting latex was filtered through a 136 um polyester filter.

The polymer dispersion obtained had a solid content of 42.57%, viscosity 6700 cps, the average particle size was 159.3 d·nm and a pH of 5.62.

Comparative Example 2

Deionized water (295.2 g) and macro CTA PAM-PAA-XA (Copolymer, 34.20% solids)(6.0 g) [1.00% based on the total monomer] were mixed under high agitation and neutralized to a pH of 6.09 with a solution of ammonium hydroxide (20% solution). The mixture was added to a suitable reactor for emulsion polymerization equipped with agitation, heating and cooling means and a slow continuous nitrogen purge. Under continuous agitation, the temperature of the reactor was raised to 68° C. At 68° C., a monomer mixture (13.0 g) [6.5% of a total 200 g of the monomer prepared by mixing of vinyl acetate (160.0) and butyl acrylate (40 g)] was added to the reactor. Once the temperature of the reactor had stabilized to 68° C., a solution of ammonium persulfate [0.08% based on total monomer prepared by dissolving ammonium persulfate (0.18 g) in deionized water (2.23 g)] was added to the reactor. Blue coloration was observed within five minutes.

The seed was kept at 68° C. for 40 minutes. A small sample was removed to check for particle size. The remaining monomers (187.0 g) were continuously fed in 3 hours and 40 minutes.

When the monomer addition was finished, a small sample of aqueous polymer dispersion was obtained to do a solid content. If the solid content has reached to theoretical solid, then the reaction was cooled to about 40° C., and the resulting latex was filtered through a 136 um polyester filter. If the solid content was not at the theoretical solid, then the aqueous polymer dispersion was further reacted until the theoretical solid is reached.

For this particular comparative example, the latex polymer dispersion was further heated for an hour at temperature 68° C. before cooling it to 40° C., and the resulting latex was filter using 136 um polyester filter.

The polymer dispersion obtained had a solid content of 39.97%, viscosity 3340 cps, the average particle size was 140.2 d·nm, and a pH of 5.16.

Comparative Example 3

Deionized water (210.0 g) was added to a suitable reactor for emulsion polymerization equipped with agitation, heating and cooling means with a slow continuous nitrogen purge. Under continuous agitation, the temperature of the reactor was raised to 70.0° C. At 70.0° C., a monomer pre-emulsion (11.56 g) [2.5% of a total 462.5 g of monomer pre-emulsion was prepared by mixing deionized water (110.0 g), sodium tridecyl ether sulfate (16.45 g) (1.5% based on the total monomer), Abex 2535 (6.58 g) (1.0% based on the total monomer), sodium bicarbonate (0.49 g), vinyl acetate (259.91 g), butyl acrylate (65.8 g), and acrylic acid (3.29 g)] was added to the reactor (the pre-emulsion was stabilized before adding), followed by a solution of ammonium persulfate (7.2 g) [20% of a total ammonium persulfate (1.0 g) dissolved in the deionized water (35.7 g)].

The seed was kept for 15 minutes. A small sample was removed to check for the particle size. The continuous addition of the remaining monomer pre-emulsion (450.9 g) and the remaining initiator solution (28.8 g) were set to finish in 3 hours. The latex was cooled after the solid conversion had reached 100%. The resulting latex was filtered using 150 um polyester filter.

The polymer dispersion obtained had a solid content of 47.25%, viscosity 105 cps, the average particle size was 185.2 d·nm and a pH of 5.3.

TABLE 1

Latex characterization

| Example | Macro CTA | Seed composition | Solids, % | Viscosity, cps | Latex PS, (d·nm) | pH | Coagulum % |
|---|---|---|---|---|---|---|---|
| Example 1 | PAA 1.5% | 5% VA/BA 80/20 | 44.9 | 2344 | 147.1 | 5.35 | 0.05 |
| Example 2 | PAA 1.5% | 5% STY/BA 50/50 | 45.15 | 400 | 175.9 | 5.17 | 0 |
| Example 3 | PAA 1.5% | 5% BA | 44.55 | 152 | 180 | 5.1 | 0.08 |
| Example 4 | PAA 1.5% | 5% BA/MMA 50/50 | 45.45 | 223 | 159.4 | 5.4 | 0.04 |
| Example 5a | PAA 1.5% | 5% VA/BA 50/50 | 45.1 | 1560 | 135 | 5.37 | 0.29 |
| Example 5b | PAA 1.5% | 20% VA/BA 50/50 | 43.94 | 388 | 211.1 | 5.34 | 0.25 |
| Example 5c | PAA 1.5% | 10% VA/BA 25/75 | 44.27 | 212 | 179.7 | 5.38 | 0.23 |
| Example 5d | PAA 1.5% | 10% STY/BA 50/50 | 44.64 | 112 | 238.2 | 5.11 | 0 |
| Example 5e | PAA 1.5% | 15% BA | 44.8 | 32 | 215 | 5.16 | 0.3 |
| Example 5f | PAA 1.5% | 5% BA | 50.1 | 856 | 210.9 | 5.15 | 0.1 |
| Example 5g | PAA 1.5% | 5% STY/BA 50/50 | 50.13 | 924 | 189 | 5.13 | 0.5 |
| Example 5h | PAM-PAA 1.5% | 5% STY/BA 50/50 | 40.1 | 292 | 169.6 | 5.06 | 0 |
| Comparative Example 1 | PAA 2.5% | 6.8% BA/VA 20/80 | 42.57 | 6700 | 159.3 | 5.62 | 0 |
| Comparative Example 2 | PAM-PAA 1% | 6.8% BA/VA 20/80 | 39.97 | 3340 | 140.2 | 5.16 | 0 |
| Comparative Example 3 | Surfactant | Surfactant based | 47.25 | 105 | 185.2 | 5.3 | 0.01 |

Latex properties in Table 1 clearly show that the latexes prepared by this novel unique process gave much lower viscosity compared to Comparative Examples 1 and 2. Therefore this unique process allows for the preparation of latexes with high solids, as shown in Examples 5f and 5 g, while still maintained relatively low viscosity.

Example 6

Paint Formulation

The latex sample prepared from Example 1 to 4, and Comparative Example 3 were prepared as architectural paints. The paint formulation was given in the following Table 2.

TABLE 2

Paint formulation 72PVC

| 72PVC | Example 1 | Example 2 | Example 3 | Example 4 | Comparative Example 3 |
|---|---|---|---|---|---|
| Raw materials | | | | | |
| Pigment Grind | | | | | |
| Water | 270.0 | 270.0 | 270.0 | 270.0 | 270.0 |
| Natrosol Plus 330 | 2.0 | 2.0 | 2.0 | 2.0 | 2.0 |
| AMP-95 | 1.0 | 1.0 | 1.0 | 1.0 | 1.0 |
| Rhodoline 226/35 | 8.0 | 8.0 | 8.0 | 8.0 | 8.0 |
| Rhodoline WA200 | 3.0 | 3.0 | 3.0 | 3.0 | 3.0 |
| Rhodoline 688 | 2.0 | 2.0 | 2.0 | 2.0 | 2.0 |
| Tiona 595 | 100.0 | 100.0 | 100.0 | 100.0 | 100.0 |
| Minex 4 | 125.0 | 125.0 | 125.0 | 125.0 | 125.0 |
| CaCO3 #10 white | 125.0 | 125.0 | 125.0 | 125.0 | 125.0 |
| Optiwhite MX | 110.0 | 110.0 | 110.0 | 110.0 | 110.0 |
| Diafil 525 | 25.0 | 25.0 | 25.0 | 25.0 | 25.0 |
| Letdown | | | | | |
| Water | 122.0 | 123.0 | 120.5 | 123.5 | 134.0 |
| Polymer | 180.4 | 178.9 | 181.8 | 178.2 | 167.6 |
| Texanol | 6.0 | 6.0 | 6.0 | 6.0 | 6.0 |
| Rhodoline 4188 | 0.0 | 0.0 | 0.0 | 0.0 | 0.0 |
| Rhodoline 688 | 2.0 | 2.0 | 2.0 | 2.0 | 2.0 |
| AMP-95 | 1.0 | 1.0 | 1.0 | 1.0 | 1.0 |
| Acrysol TT-935 | 6.1 | 7.5 | 8.9 | 7.4 | 11.1 |
| Water | 64.1 | 62.4 | 61.3 | 62.8 | 58.9 |
| Total | 1152.6 | 1151.9 | 1152.6 | 1151.9 | 1151.6 |

TABLE 3

Paint formulation 50PVC

| 50PVC | Example 1 | Example 2 | Example 3 | Example 4 | Comparative Example 3 |
|---|---|---|---|---|---|
| Pigment Grind | | | | | |
| Water | 210.0 | 210.0 | 210.0 | 210.0 | 210.0 |
| Natrosol Plus 330 | 2.0 | 2.0 | 2.0 | 2.0 | 2.0 |
| AMP-95 | 1.0 | 1.0 | 1.0 | 1.0 | 1.0 |
| Acticide BW-20 | 0.0 | 0.0 | 0.0 | 0.0 | 0.0 |
| Rhodoline 226/35 | 6.0 | 6.0 | 6.0 | 6.0 | 6.0 |
| Rhodoline WA200 | 3.0 | 3.0 | 3.0 | 3.0 | 3.0 |
| Rhodoline 688 | 2.0 | 2.0 | 2.0 | 2.0 | 2.0 |
| Tiona 595 | 200.0 | 200.0 | 200.0 | 200.0 | 200.0 |
| CaCO3 #10 white | 120.0 | 120.0 | 120.0 | 120.0 | 120.0 |
| Optiwhite MX | 75.0 | 75.0 | 75.0 | 75.0 | 75.0 |
| Diafil 525 | 25.0 | 25.0 | 25.0 | 25.0 | 25.0 |
| Letdown | | | | | |
| Water | 83.0 | 85.0 | 85.0 | 85.0 | 107.0 |
| Binder | 358.8 | 356.7 | 356.7 | 356.7 | 333.1 |
| Texanol | 10.0 | 10.0 | 10.0 | 10.0 | 10.0 |
| Rhodoline 4188 | 0.0 | 0.0 | 0.0 | 0.0 | 0.0 |
| Rhodoline 688 | 2.0 | 2.0 | 2.0 | 2.0 | 2.0 |
| Ammonium hydroxide | 1.2 | 1.2 | 1.1 | 1.1 | 1.0 |
| Aquaflow NLS220 | 7.4 | 9.0 | 8.5 | 8.7 | 22.2 |
| Water | 32.4 | 30.8 | 31.5 | 31.5 | 18.0 |
| Total | 1138.8 | 1138.6 | 1138.6 | 1139.0 | 1137.3 |

TABLE 4

Dry Paint Performance Properties of 72PVC Paint

| 72 PVC | Example 1 | Example 2 | Example 3 | Example 4 | Comparative Example 3 |
|---|---|---|---|---|---|
| Gloss 60 degrees | 2.2 | 2.2 | 2.2 | 2.2 | 2.1 |
| Opacity | 97.21 | 97.47 | 97.31 | 97.7 | 97.24 |
| Block (room temperature) | 10 | 10 | 10 | 10 | 10 |
| Block (oven) | 10 | 10 | 10 | 10 | 10 |
| Scrub, (brush, w/o shim, non-abrasive medium) | | | | | |
| 1st cut | 800 | 800 | 183 | 321 | 53 |
| 50% cut | 1280 | 1200 | 400 | 427 | 118 |
| Adhesion, CRS, 1 day, dry/wet | 5B/5B | 5B/5B | 5B/5B | 5B/5B | 4B/1B |
| Adhesion, CRS, 7 day, dry/wet | 5B/5B | 5B/5B | 5B/5B | 5B/5B | 5B/1B |

TABLE 5

Dry Paint Performance Properties of 50PVC Paint

| 50 PVC | Example 1 | Example 2 | Example 3 | Example 4 | Comparative Example 3 |
|---|---|---|---|---|---|
| Gloss 60 degrees | 2.6 | 2.9 | 2.6 | 2.9 | 2.7 |
| Opacity | 96.67 | 96.27 | 96.61 | 96.5 | 96.56 |
| Block (room temperature) | 10 | 10 | 10 | 10 | 10 |
| Block (oven) | 10 | 10 | 10 | 10 | 10 |
| Scrub, 1st cut | 2058 | 1911 | run out of paint | 2225 | 377 |
| Scrub, 50% cut | 2509 | 2421 | run out of paint | 2591 | 468 |
| Adhesion, CRS, 1 day, dry/wet | 5B/5B | 5B/5B | 5B/5B | 5B/5B | 4B/0B |
| Adhesion, CRS, 7 day, dry/wet | 5B/5B | 5B/5B | 5B/5B | 5B/5B | 4B/0B |

It clearly showed that the PISA latexes prepared by this innovative process significantly improved scrub resistance and adhesion, especially wet adhesion over metal substrates compared to traditional surfactant based latexes It should be apparent that embodiments and equivalents other than those expressly discussed above come within the spirit and scope of the present invention. Thus, the present invention is not limited by the above description but is defined by the appended claims.

What is claimed is:

1. A process for preparing an aqueous polymer dispersion, comprising:
   a. providing an initial composition comprising:
      i. about 0.5 to about 6 parts of a selective hydrophilic macro-RAFT agent of formula (I); and
      ii. about 0.1 to about 30 parts of at least one first monomer;
      iii. about 0.05 to about 0.5 parts of a free radical initiator; and
      iv. water,
   b. reacting the initial composition from step (a) under suitable conditions to generate a seed composition, wherein the seed composition comprises a polymer formed from the selective hydrophilic macro-RAFT agent of formula (I) and the at least one first monomer; and
   c. combining the seed composition from step (b) with:
      i. about 0.05 to about 0.8 parts of at least one initiator; and
      ii. about 0.1 to about 99 parts of at least one second monomer, under conditions suitable for reacting the seed composition with the at least one second monomer to form the aqueous polymer dispersion;

wherein the at least one first monomer and at least one second monomer are different, wherein the first monomer comprises styrene monomers, acrylic monomers, vinyl ester monomers, or mixtures thereof, wherein the at least one second monomer comprises styrene monomers, acrylic monomers, vinyl ester monomers, or mixtures thereof;

wherein the process is substantially free of surfactants; and wherein the selective hydrophilic macro-RAFT agent of formula (I) is defined as follows:

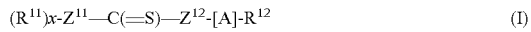

(R$^{11}$)x-Z$^{11}$—C(=S)—Z$^{12}$-[A]-R$^{12}$ (I)

wherein:
Z$^{11}$ represents C, N, O, S or P,
Z$^{12}$ represents S or P,
R$^{11}$ and R$^{12}$, which may be identical or different, represent:
   an optionally substituted alkyl, acyl, aryl, alkene or alkyne group (i), or
   a saturated or unsaturated, optionally substituted or aromatic carbon-based ring (ii), or
   a saturated or unsaturated, optionally substituted heterocycle (iii), these groups and rings (i), (ii) and (iii) may be optionally substituted with substituted phenyl groups, substituted aromatic groups or groups: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidino, hydroxyl (—OH), amino (—NR$_2$), halogen, allyl, epoxy, alkoxy (—OR), S-alkyl, S-aryl, groups of hydrophilic or ionic nature selected from the group of alkali metal salts of carboxylic acids, alkali metal salts of sulphonic acid, polyalkylene oxide (PEO or PPO) chains and cationic substituents (quaternary ammonium salts), R represents an alkyl or aryl group, x corresponds to the valency of Z$^{11}$, or alternatively x is 0, in which case Z$^{11}$ represents a phenyl, alkene or alkyne radical, optionally substituted with an optionally substituted alkyl; acyl; aryl; alkene or alkyne group; an optionally substituted, saturated, unsaturated, or aromatic, carbon-based ring; an optionally substituted, saturated or unsaturated heterocycle; alkoxycarbonyl or aryloxycarbonyl (—COOR); carboxyl (COOH); acyloxy (—O$_2$CR); carbamoyl (—CONR$_2$); cyano (—CN); alkylcarbonyl; alkylarylcarbonyl; arylcarbonyl; arylalkylcarbonyl; phthalimido; maleimido; succinimido; amidino; guanidino; hydroxyl (—OH); amino (—NR$_2$); halogen; allyl; epoxy; alkoxy (—OR), S-alkyl; S-aryl groups; groups of hydrophilic or ionic nature selected from the group of alkali metal salts of carboxylic acids, alkali metal salts of sulphonic acid, polyalkylene oxide (PEO or PPO) chains and cationic substituents (quaternary ammonium salts); and A represents a monoblock, diblock or triblock polymer comprising at least a first block which is hydrophilic in nature and an optional second block which is hydrophobic or hydrophilic in nature.

2. The process according to claim 1, further wherein the aqueous polymer dispersion is formed using polymerization induced self-assembly of a latex polymer composition.

3. The process according to claim 1, wherein a latex polymer composition formed in step (c) has a solids content of at least 40%, and a viscosity of less than 4000 cps, wherein the viscosity is determined using a Brookfield Model LVT viscometer at 30 rpm and No. 3 spindle.

4. The process according to claim 1, wherein the selective hydrophilic macro-RAFT agent is present in an amount of about 0.5 to about 3 parts.

5. The process according to claim 1, wherein the selective hydrophilic macro-RAFT agent of formula (I) is selected from the group consisting of PAA-Xa, PAM-Xa, PAM-PAA-Xa, and PDMA-Xa.

6. A composition comprising a latex polymer composition made according to the process of claim 1, wherein the composition is obtained by a free-radical emulsion polymerization process.

7. A composition comprising a latex polymer composition made according to the process of claim 1, wherein the composition is a coating composition, paint composition, industrial coating, adhesive composition, mastic composition, sealant composition, or wood coating.

8. The composition of claim 6, comprising a scrub resistance that is at least about five times more than a surfactant-based latex.

9. The composition of claim 6, comprising adhesion to glass, metal, and combinations thereof.

10. The process according to claim 1, wherein the at least one first monomer comprises methyl methacrylate/butyl acrylate in a ratio of about 40:60 to about 60:40.

11. The process according to claim 1, wherein the at least one first monomer is selected from a butyl acrylate/methyl methacrylate copolymer.

12. The composition according to claim 6, wherein the seed composition consisting consists of a butyl acrylate/methyl methacrylate copolymer.

13. A process for preparing an aqueous polymer dispersion, comprising:
   a. providing an initial composition comprising:
      i. about 0.5 to about 6 parts of a selective hydrophilic macro-RAFT agent of formula (I); and
      ii. about 0.1 to about 30 parts of at least one first monomer;
      iii. about 0.05 to about 0.5 parts of a free radical initiator; and
      iv. water,
   b. reacting the initial composition from step (a) under suitable conditions to generate a seed composition, wherein the seed composition comprises a polymer formed from the selective hydrophilic macro-RAFT agent of formula (I) and the at least one first monomer; and
   c. combining the seed composition from step (b) with:
      i. about 0.05 to about 0.8 parts of at least one initiator; and
      ii. about 0.1 to about 99 parts of at least one second monomer,
   under conditions suitable for reacting the seed composition with the at least one second monomer to form the aqueous polymer dispersion;
   wherein the at least one first monomer and at least one second monomer are different, wherein the at least one first monomer is selected from the group consisting of styrene monomers, acrylic monomers, and mixtures thereof;
   wherein the at least one second monomer is selected from the group consisting of styrene monomers, acrylic monomers, and mixtures thereof;
   wherein the selective hydrophilic macro-RAFT agent of formula (I) is defined as follows:

$(R^{11})_x\text{-}Z^{11}\text{---}C(=S)\text{---}Z^{12}\text{-}[A]\text{-}R^{12}$     (I)

wherein:
   $Z^{11}$ represents C, N, O, S or P,
   $Z^{12}$ represents S or P,
   $R^{11}$ and $R^{12}$, which may be identical or different, represent:
      an optionally substituted alkyl, acyl, aryl, alkene or alkyne group (i), or
      a saturated or unsaturated, optionally substituted or aromatic carbon-based ring (ii), or
      a saturated or unsaturated, optionally substituted heterocycle (iii), these groups and rings (i), (ii) and (iii) may be optionally substituted with substituted phenyl groups, substituted aromatic groups or groups: alkoxycarbonyl or aryloxycarbonyl (—COOR), carboxyl (—COOH), acyloxy (—O₂CR), carbamoyl (—CONR₂), cyano (—CN), alkylcarbonyl, alkylarylcarbonyl, arylcarbonyl, arylalkylcarbonyl, phthalimido, maleimido, succinimido, amidino, guanidino, hydroxyl (—OH), amino (—NR₂), halogen, allyl, epoxy, alkoxy (—OR), S-alkyl, S-aryl, groups of hydrophilic or ionic nature selected from the group of alkali metal salts of carboxylic acids, alkali metal salts of sulphonic acid, polyalkylene oxide (PEO or PPO) chains and cationic substituents (quaternary ammonium salts),
   R represents an alkyl or aryl group,
   x corresponds to the valency of $Z^{11}$, or alternatively x is 0, in which case $Z^{11}$ represents a phenyl, alkene or alkyne radical, optionally substituted with an optionally substituted alkyl; acyl; aryl; alkene or alkyne group; an optionally substituted, saturated, unsaturated, or aromatic, carbon-based ring; an optionally substituted, saturated or unsaturated heterocycle; alkoxycarbonyl or aryloxycarbonyl (—COOR); carboxyl (COOH); acyloxy (—O₂CR); carbamoyl (—CONR₂); cyano (—CN); alkylcarbonyl; alkylarylcarbonyl; arylcarbonyl; arylalkylcarbonyl; phthalimido; maleimido; succinimido; amidino; guanidino; hydroxyl (—OH); amino (—NR₂); halogen; allyl; epoxy; alkoxy (—OR), S-alkyl; S-aryl groups; groups of hydrophilic or ionic nature selected from the group of alkali metal salts of carboxylic acids, alkali metal salts of sulphonic acid, polyalkylene oxide (PEO or PPO) chains and cationic substituents (quaternary ammonium salts); and
   A represents a monoblock, diblock or triblock polymer comprising at least a first block which is hydrophilic in nature and an optional second block which is hydrophobic or hydrophilic in nature.

14. The process according to claim 1, wherein the acrylic monomers are selected from the group consisting of acrylic acid, acrylic acid esters, methacrylic acid, and methacrylic acid esters.

15. A composition comprising a latex polymer composition made according to the process of claim 1, wherein the composition is obtained by a free-radical emulsion polymerization process, wherein the styrene or acrylic monomers are selected from the group consisting of styrene, butyl acrylate, methacrylic acid, and mixtures thereof.

16. The process according to claim 1, wherein the at least one first monomer comprises monomers selected from the group consisting of styrene, acrylic acid, acrylic acid esters, butyl acrylate, methacrylic acid, methacrylic acid esters, methyl methacrylate, vinyl acetate, and mixtures thereof.

17. The process according to claim 1, wherein the at least one second monomer comprises vinyl acetate.

18. The process according to claim 1, wherein the at least one first monomer comprises methyl methacrylate/butyl acrylate in a ratio of about 50:50.

19. The process according to claim 13, wherein the at least one first monomer is selected from the group consisting of styrene, acrylic acid, acrylic acid esters, butyl acrylate, methacrylic acid, methacrylic acid esters, methyl methacrylate, and mixtures thereof.

20. The process according to claim 13, wherein the at least one second monomer is selected from the group consisting of styrene, acrylic acid, acrylic acid esters, butyl acrylate, methacrylic acid, methacrylic acid esters, methyl methacrylate, and mixtures thereof.

* * * * *